United States Patent Office 2,870,097
Patented Jan. 20, 1959

2,870,097
PROCESS FOR THE PREPARATION OF POLYMERIC ACETALS

Dexter Brayton Pattison, Wilmington, Del., assignor to E. I. du Pont de Nemours and Company, Wilmington, Del., a corporation of Delaware No Drawing. Application July 1, 1955
Serial No. 519,662

9 Claims. (Cl. 260—2)

This invention is directed to a process for the preparation of a new class of polymers which have terminal hydroxyl or thiol groups. These polymers contain a plurality of acetal linkages and tetramethylene groups as the result of condensing certain 7-membered acetals of the 1,3-dioxepane series with varying percentages of polyhydroxy compounds; said polymers are useful in making resilient foams, elastomers, cosmetic creams and textile treating agents.

It is an object of this invention to provide a process for producing a class of polymers which may be used in reactions with isocyanates to make elastomers; these elastomers have desirable low temperature properties because of the unusually low melting points of the novel polyacetals of this invention.

It is an object of this invention to provide a process for forming linear polymers of controllable molecular weight, said polymers containing acetal linkages, by controlling the ratio of cyclic acetal to polyol; the process may be continuous or conducted on a batch basis.

It is an object of this invention to produce polymers which contain novel functional groups containing sulfur, nitrogen (amine groups) and oxygen (aromatic ethers).

It is a further object of this invention to produce certain novel polyacetals for use in the production of resilient foams, cosmetic creams and textile treating agents.

A method has been needed for making polyalkylene ether glycols of low melting point, with a controllable molecular weight and terminated by hydroxyl groups; said polymer should preferably be made from low cost intermediates. These objectives are achieved in the present invention in which a 7-membered cyclic acetal is reacted with an organic polyol or polythiol to produce a linear polymer containing carbon chain radicals alternating with methylene or substituted methylene groups and each connected to the other through —O— or —S— linkages, said polymer having —OH or —SH terminal groups.

The novel process utilized in the preparation of these polymers involves the heating of not less than the theoretical equivalent of 7-membered acetal selected from the group consisting of

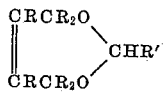

and

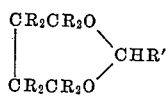

where R=H or —CH$_3$ and R'=H, C$_1$–C$_6$ alkyl, or phenyl with 1 mole of an organic compound having 2–6 hydroxyl or thiol groups as the sole reactive groups in the presence of an acid catalyst. The theoretical equivalent is 1 mole of the cyclic acetal per —OH or —SH group. When the cyclic acetals as defined above react with compounds containing two hydroxyl groups, polymers terminated by hydroxy groups are formed according to the following equation:

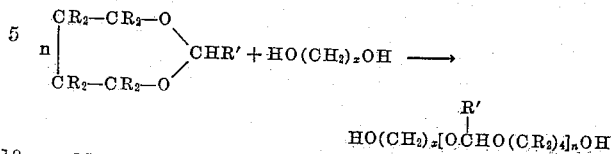

$n$ = No. moles of starting acetal.

Operable hydroxyl and mercapto compounds which may be utilized in the present invention are alkylene glycols, alkanol mercaptans, such as HO(CH$_2$)$_2$SH, dimercaptans such as HS(CH$_2$)$_5$SH, polymers terminated by hydroxyl groups, dihydric phenols, bis-hydroxyalkyl ethers of dihydric phenols, di- and tri-alkanol amines and polyols such as glycerol, the tetritols, the pentitols and the hexitols, having one hydroxy group per carbon atom (e. g., sorbitol, mannitol and dulcitol).

Mixtures of cyclic acetals may be used in the prepration of the present linear polymers as well as mixtures of the polyol. The use of two or more cyclic acetals having differing substituents on the carbon atoms tends to give linear polyacetals which have lower melting points than those having the same substituents. When polyols containing more than two —OH or —SH groups are used, the polyacetal will contain branched chains. The degree of branching may be controlled by using more or less of these polyols in admixture with di-hydroxy compounds.

The novel process for producing these polyacetals involves a heating of the reactants in a controlled ratio and in the presence of an acid catalyst to give a polymer of the desired molecular weight. The polyacetals produced are colorless and in physical form range from syrupy liquids to soft solids which normally melt at a temperature within the range of —30° C. to +20° C. The catalyst is generally neutralized before the product is used.

The molecular weight of the polyacetal is controlled by the ratio of cyclic acetal to polyol. To increase the molecular weight the relative amount of the cyclic acetal is increased. This reaction can be run in stages, i. e., after reaching a given molecular weight, the molecular weight can be increased by reaction with additional cyclic acetal. There must always be at least 1 mole of cyclic acetal per —OH or —SH groups on the polyol. The upper limit of the ratio of cyclic acetal to —OH or —SH groups is not critical. Generally speaking, it is seldom necessary to exceed a ratio of about 100 to 1 to provide a polymer of suitable molecular weight. An equilibrium is usually reached and some unreacted cyclic acetal is recovered. The process can be stopped before equilibrium is reached to obtain a lower molecular weight polymer.

Temperatures of 20–25° C. to about 175° C. are satisfactory for the condensation. Preferably, temperatures of 100–150° C. are utilized. At the lower temperatures longer time are required; thus, about 20–24 hours are required to reach the same degree of condensation at a lower temperature as is reached in about one hour at 150° C.

Usually the reactants form homogeneous solutions and stirring is not a necessity; however, it is general procedure to stir the solution and any tendency toward a separation of phases is thus overcome.

Operable acid catalysts are the well known strong acids and acid-acting compounds commonly used in making acetals. These include hydrochloric acid (either aqueous or anhydrous), sulfuric acid, phosphoric acid, benzene sulfonic acid, p-toluene sulfonic acid, camphor sulfonic acid, zinc chloride, aluminum chloride, ferric chloride, hydrofluoric acid, boron trifluoride, and the like.

The polymerization may be stopped by neutralizing the acid catalyst. Suitable alkaline materials are calcium hydroxide, calcium carbonate, sodium hydroxide, sodium phosphate, organic amines, such as n-butyl amine, etc. The polymerization may be stopped when equilibrium has been reached or before if desired.

The linear polyacetal may be recovered by neutralizing the catalyst, distilling off unreacted cyclic acetal, and filtering off insoluble matter resulting from neutralization of the catalyst. If desired, the reaction mass may be washed with water after neutralization and then the unreacted cyclic acetal may be steam-distilled off. When the neutralized catalyst is soluble in the linear polyacetal, as from amine neutralization, it may preferably be left in the polyacetal since the amount present is so small.

It is preferable, but not essential, to conduct the reaction in the absence of air. It is helpful in the isolation of the polymer if after the reaction has been run a solvent such as benzene is added to lower the viscosity of the mass so that filtration is facilitated. The amount of benzene employed as solvent is approximately equal to the weight of polyacetal if the molecular weight of the product is 3,000 or higher; and, about one-fifth the weight of polyacetal if the molecular weight of the product is 1,000.

A small amount of an antioxidant such as n-phenyl-beta-naphthylamine may be added after the acid catalyst has been neutralized to effect product stability.

This invention is illustrated by the following examples wherein $n+m=$ number of moles of starting cyclic acetal.

*Example 1*

A solution of 400 g. 1,3-dioxepane (3.92 moles), 10 g. 1,4-butanediol (0.111 mole), and 0.037 g. 96% sulfuric acid was heated to 130 during 2 hours under nitrogen and held for 2 hours at 130–135° C. After cooling below 100° C. a solution of 0.2 g. of trisodium phosphate in 300 g. water was added. The mixture was distilled until the vapor temperature was 100° C. The distillate (180 g.) was salted with 36 g. sodium chloride, giving 45 g. 1,3-dioxepane which contained about 99% 1,3-dioxepane and 1% water as estimated by a refractive index measurement. The hot polymer was washed twice with hot water in a separatory funnel, and then water was removed by evaporation under reduced pressure, finishing at 120° C. and 2 mm. pressure for 2 hours. The yield of polytetramethylene formal glycol, $$HO(CH_2)_4[OCH_2O(CH_2)_4]_nOH$$

was 342 g. This was 94% of the theoretical yield, allowing for recovered 1,3-dioxepane. The hydroxyl number was 37.1, the molecular weight was 3,040 and the melting point was 20° C.

When the amount of 1,4-butanediol is increased to 0.1 mole per mole of 1,3-dioxepane, the molecular weight of the product is 1046 and the yield is 91%.

*Example 2*

A mixture of 4 g. 2-mercaptoethanol (0.05 mole), 46 g. 1,3-dioxepane (0.45 mole), and 0.006 g. 95% sulfuric acid was converted into polymer by heating under nitrogen to 130° C. during two hours, and held 2 hours at 130–135° C. When cool, 200 g. benzene, 1 g. calcium hydroxide and 1 g. Nuchar was added, and the mixture stirred a half hour. After removal of solids by filtration, the solvent was removed by evaporation under reduced pressure, finishing at 120° C. and 4 mm. pressure for 2 hours. The yield of almost colorless, viscous polymer $$HO[(CH_2)_4OCH_2O]_m(CH_2)_2S(CH_2)$$
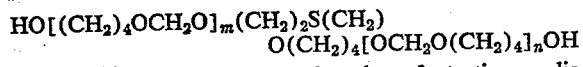

was 32 g.; $n+m=$ number of moles of starting cyclic acetal.

*Example 3*

A mixture of 200 g. 1,3-dioxepane (1.96 moles), 9 g. 1,5-pentanedithiol (0.066 mole), and 0.3 g. p-toluene-sulfonic acid was converted into a polyformal by the method of Example 2. The polyformal $$HO[(CH_2)_4O(CH_2O)]_m(CH_2)_4OCH_2S(CH_2)_5$$
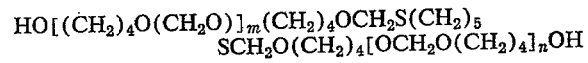

was a viscous liquid, with a hydroxyl number of 47.7, a molecular weight of 2350, and a melting point of 19° C.

*Example 4*

A mixture of 46 g. 1,3-dioxepane (0.45 mole), 10.3 g. 1,10-decanedithiol (0.05 mole) and 0.008 g. 96% sulfuric acid was converted into polyformal by the method of Example 2. The yield of white solid polyformal $$HO[CH_2)_4OCH_2O]_m(CH_2)_4OCH_2S(CH_2)_{10}$$
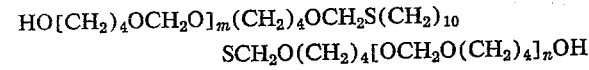

which melted at about 110° C., was 40 g.

*Example 5*

A polyester, HO—R—OH, having an acid number of 0.6, a hydroxyl number of 59.2 and molecular weight of 1870 is prepared by heating a mixture of 875 g. of adipic acid, 425 g. of ethylene glycol, 165 g. of propylene glycol and 0.1 g. of p-toluene sulfonic acid over 10 hours up to 220° C. under nitrogen, and holding for 10 hours at 210–220° C. and at a pressure of 1 mm. of Hg. The product was cooled and used as described below.

A mixture of 60 g. of the above polyester, 120 g. 1,3-dioxepane and 0.022 g. 96% $H_2SO_4$ was converted into a polyformal, $$HO[(CH_2)_4OCH_2O]_mR[OCH_2O(CH_2)_4]_nOH$$

by the method of Example 2. A yield of 130 g. of viscous oil was obtained. The hydroxyl number was 28.9 and the molecular weight was 3880.

*Example 6*

The equation for this reaction is the same as in Example 5, except that HO—R—OH now refers to a hydroxyl-terminated polychloroprene, which had a molecular weight of 1520, and was prepared as follows:

A solution of 600 g. of chloroprene and 154.8 g. 2,2'-azobis(isobutyric acid, ethyl ester) in 1800 cc. toluene was heated at 88–90° C. for 4.5 hours. Then 6 g. of an antioxidant, 2,6-di-t-butyl-4-methylphenol, was added and the solvent removed under reduced pressure leaving 713 g. of polymer terminated by ethyl butyrate groups. These were reduced to hydroxyl groups by dissolving the polymer in 1950 cc. of anhydrous ether, adding this solution to a slurry prepared by refluxing 54 g. lithium aluminum hydride in 3950 cc. of ether, and refluxing 2 hours. The reaction mass was cooled and 55 cc. of water was added. Then enough 25% sulfuric acid was added to dissolve the gel. The liquid was decanted and washed, first with a saturated aqueous solution of sodium bicarbonate, and then with water. The solvent was stripped, leaving 582 g. of dihydroxy polymer having a hydroxyl number of 73.4.

A mixture of 25 g. of the above polychloroprene glycol, 50 g. 1,3-dioxepane, and 0.013 g. 96% sulfuric acid was converted into a polyformal by the method of Example 2. The resultant product had a hydroxyl number of 43.9 and a molecular weight of 2560. The yield was 58 g.

*Example 7*

The equation for the reaction is the same as in Example 5, except that in this case HO—R—OH now refers to Carbowax 400, a commercially available polyethylene ether glycol of 400 average molecular weight with the formula, $HO(CH_2)_2[OCH_2CH_2]_nOH$.

A mixture of 60 g. anhydrous polyethylene ether glycol, 300 g. 1,3-dioxepane, and 0.051 g. 96% sulfuric acid was converted into a polyformal by the method of Example 2. The polyformal was a viscous oil obtained in 85% yield. The hydroxyl number was 62.0 and the molecular weight was 1810.

*Example 8*

The polyformal was made by the method of Example 2, starting with 200 g. 1,3-dioxepane (1.96 moles), 18.8 g. bis(2-hydroxyethyl)-resorcinol (0.1 mole), and 0.2 g. p-toluene sulfonic acid. The yield of polyformal was 161 g. with a hydroxyl number of 68, a molecular weight of 1650, and a melting point of 10° C.

*Example 9*

A mixture of 200 g. 1,3-dioxepane (1.96 moles), 9.0 g. pentaerythritol (0.067 mole), and 0.023 g. 96% sulfuric acid was converted into a polyformal by the method of Example 2. There was obtained 168 g. of a moderately viscous oil with a hydroxyl number of 86.8.

*Example 10*

A mixture of 200 g. (1.96 moles) 1,3-dioxepane, 7.3 g. sorbitol (0.04 mole) and 0.023 g. 96% sulfuric acid was converted into a polyformal by the method of Example 2. The yield of polyformal was 173 g. This was a viscous oil with a hydroxyl number of 72.0.

In addition, 1,3-dioxepane and mannitol, another hexitol, were converted in 83% yield by the present invention into the corresponding polyformal, a viscous, almost colorless oil with a hydroxyl number of 83.7.

*Example 11*

A mixture of 200 g. 1,3-dioxepane (1.96 moles), 6 g. diethanolamine (0.058 mole) and 4.0 g. 96% sulfuric acid was heated in a nitrogen atmosphere one hour at 130° C., and the color became dark brown. When cool, 10 g. calcium hydroxide, 5 g. decolorizing carbon, and 180 g. benzene were added. After filtering, the solvent was removed by evaporation under reduced pressure finishing at 120° C. under 4 mm. pressure for 2 hours. The yield of polyformal HO[CH$_2$)$_4$OCH$_2$O]$_m$(CH$_2$)$_2$NH(CH$_2$)$_2$
[OCH$_2$O(CH$_2$)$_4$]$_n$OH was 137. g., with a hydroxyl number of 62.8, a molecular weight of 1790 and a melting point of 11° C.

*Example 12*

To a mixture of 200 g. 1,3-dioxepane (1.92 moles) and 12 g. N-methyldiethanolamine (0.1 mole) cooled to 15° C., there was added 12.2 g. 96% sulfuric acid (0.125 mole) dropwise at 15° C. After stirring 20 hours at room temperature, the polyformal was isolated by the method of Example 11 using 12 g. calcium hydroxide for neutralization of acid. The weight of colorless, viscous polyformal

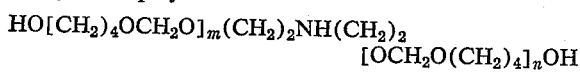

was 160 g. with a hydroxyl number of 37.2 and a molecular weight of 3010.

*Example 13*

A mixture of 180 g. 1,3-dioxep-5-ene, 5.4 g. 1,4-butanediol, and 0.3 g. p-toluene sulfonic acid was converted into a polyformal by the method of Example 2. There was recovered 135 g. 1,3-dioxep-5-ene, and 29 g. of polyformal, HOR$_1$(OCH$_2$OR$_1$)$_n$OH where

or

—CH$_2$CH=CHCH$_2$— was obtained.

*Example 14*

A mixture of 36 g. 1,3-dioxep-5-ene (0.36 mole), 144 g. 1,3-dioxepane (1.42 moles), 5.4 g. 1,4-butanediol, and 0.2 g. p-toluene sulfonic acid was converted into polyformal by the method of Example 2. The yield of polyformal was 122 g., with a hydroxyl number of 61.7 and a molecular weight of 1820. The melting point was 8° C., versus a melting point of 20° C. for the saturated polytetramethylene formal.

*Example 15*

A mixture of 250 parts 5-methyl-1,3-dioxepane, 20 parts 1,5-pentanediol, and 1 part p-toluene sulfonic acid was converted into a polyformal by the method of Example 2. The yield of polyformal, HOR$_1$(OCH$_2$OR$_1$)$_n$OH where

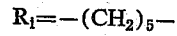

or

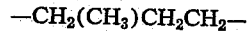

was 111 parts, with a melting point of —25° C.

*Example 16*

This example illustrates that a copolymer made from 80 mole percent 1,3-dioxepane and 20 mole percent 5-methyl-1,3-dioxepane has a surprisingly low melting point.

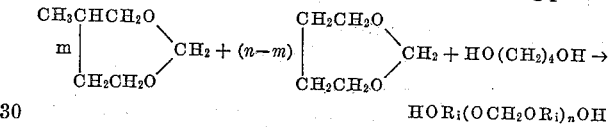

where R$_1$=—CH$_2$CH(CH$_3$)CH$_2$CH$_2$— in $m$ cases and —(CH$_2$)$_4$— in $(n+1-m)$ cases.

A mixture of 23 g. 5-methyl-1,3-dioxepane (0.20 mole), 82 g. 1,3-dioxepane (0.80 mole), 3 g. 1,4-butanediol (0.03 mole), and 0.2 g. p-toluene sulfonic acid was converted into polyformal by the method of Example 2. The yield of viscous oil was 73 g. with a hydroxyl number of 47.3 and a molecular weight of 2370. The melting point was —20° C., whereas the corresponding polyformal with no methyl side chain groups, polytetramethylene formal, melts at 20° C.

*Example 17*

A mixture of 50 g. 4,7-dimethyl-1,3-dioxepane (0.38 mole, 4 g. 1,4-butanediol (0.04 mole), and 0.2 g. p-toluene sulfonic acid was converted into polyformal by the method of Example 2. The yield of polyformal was 20 g. and approximately an equal amount of unreacted 4,7-dimethyl-1,3-dioxepane was obtained. This polyformal, HOR$_1$(OCH$_2$OR$_1$)$_n$OH where R$_1$=—(CH$_2$)$_4$— or

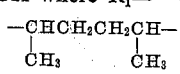

melts at about —55° C.

*Example 18*

A mixture of 8.4 moles 1,4-butanediol, 3.6 moles 1,5-pentanediol, 12.0 moles paraformaldehyde and a trace of p-toluene sulfonic acid was agitated at 125° C. under nitrogen for 5 hours. Benzene was added periodically to keep the temperature at 125° C., and water was removed as formed, by distillation of the water-benzene azeotrope.

A solution of 357 g. of this crude polyformal, 634 g. 1,3-dioxepane, and 0.4 g. p-toluene sulfonic acid was heated under reflux (150° C.) for 3 hours. After cooling, 570 g. benzene, 5 g. calcium hydroxide, and 3 g. Nuchar were added, and the mixture was stirred one hour and filtered. After evaporation, finishing at 130° C. and 5 mm. pressure for two hours, the yield of viscous polyformal was 776 g. The melting point was 8° C., the hydroxyl number 36.8, and the molecular weight 3050.

*Example 19*

A mixture of 189 g. 1,4-butanediol, 110 g. thiodiglycol, 95 g. paraformaldehyde, and 0.3 g. p-toluene sulfonic acid was allowed to react by the method of Example 18. Then 654 g. 1,3-dioxepane and 0.4 g. p-toluene sulfonic acid were added and the reaction was continued by the method of Example 18 to give 786 g. of viscous polyformal with a melting point of 9° C., a hydroxyl number of 40.3, and a molecular weight of 2785.

*Example 20*

When Example 1 is repeated, using 2-methyl-1,3-dioxepane, 2-hexyl-1,3-dioxepane or 2-phenyl-1,3-dioxepane, in molar amounts equivalent to the 1,3-dioxepane of Example 1, the corresponding methyl-, hexyl- or phenyl-substituted polyacetal is obtained.

I claim:

1. The process of preparing linear polymers of controllable molecular weight, said polymers containing acetal linkages, which process requires reacting, in the presence of an acid catalyst, a 7-membered cyclic acetal taken from the group consisting of

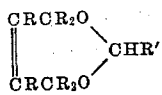

and

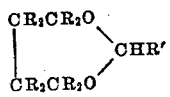

where R is taken from the group consisting of H and $CH_3$ and R' is taken from the group consisting of H, $C_1$–$C_6$ alkyl and phenyl, with an organic compound having 2 to 6 groups taken from the group consisting of alcoholic hydroxyl and —SH, at least one mole of cyclic acetal being present for each of said groups, the molecular weight of said polymer being increased when the relative amount of said cyclic acetal is increased.

2. The process of claim 1 wherein a mixture of the described cyclic acetals is reacted in the presence of an acid catalyst, with an organic compound having 2 to 6 groups taken from the group consisting of alcoholic hydroxyl and —SH, at least one mole of said mixture being present for each of said groups.

3. The process of preparing linear polymers of controllable molecular weight, said polymers containing acetal linkages, which process requires reacting, in the presence of an acid catalyst, a 7-membered cyclic acetal taken from the group consisting of

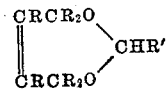

and

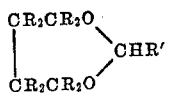

where R is taken from the group consisting of H and $CH_3$ and R' is taken from the group consisting of H, $C_1$–$C_6$ alkyl and phenyl, with an organic compound having 2 groups taken from the group consisting of alcoholic hydroxyl and —SH, at least one mole of cyclic acetal being present for each of said groups, the molecular weight of said polymer being increased when the relative amount of said cyclic acetal is increased.

4. The process of preparing linear polymers of controllable molecular weight, said polymers containing acetal linkages, which process requires reacting, in the presence of an acid catalyst, a 7-membered cyclic acetal taken from the group consisting of

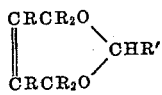

and

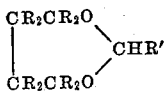

where R is taken from the group consisting of H and $CH_3$ and R' is taken from the group consisting of H, $C_1$–$C_6$ alkyl and phenyl, with 1,4-butanediol, at least one mole of cyclic acetal being present for each alcoholic hydroxyl group, the molecular weight of said polymer being increased when the relative amount of said cyclic acetal is increased.

5. The process of preparing linear polymers of controllable molecular weight, said polymers containing acetal linkages, which process requires reacting, in the presence of an acid catalyst, a 7-membered cyclic acetal taken from the group consisting of

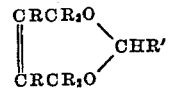

and

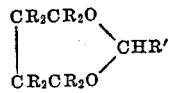

where R is taken from the group consisting of H and $CH_3$ and R' is taken from the group consisting of H, $C_1$–$C_6$ alkyl and phenyl, with an organic compound having 2 groups taken from the group consisting of alcoholic hydroxyl and —SH, 1 to 25 moles of cyclic acetal being present for each of said groups, the molecular weight of said polymer being increased when the relative amount of said cyclic acetal is increased.

6. The process of preparing linear polymers of controllable molecular weight, said polymers containing acetal linkages, which process requires reacting, in the presence of an acid catalyst, from 2 to 50 moles of 1,3-dioxepane with an organic compound having 2 alcoholic hydroxyl groups.

7. The process of preparing linear polymers of controllable molecular weight, said polymers containing acetal linkages, which process requires reacting, in the presence of an acid catalyst, from 2 to 50 moles, of 1,3-dioxepane with 1,4-butanediol.

8. The process of preparing linear polymers of controllable molecular weight, said polymers containing acetal linkages, which process requires reacting, in the presence of an acid catalyst, from 2 to 50 moles of 1,3-dioxep-5-ene with an organic compound having two alcoholic hydroxyl groups.

9. The process of preparing linear polymers of controllable molecular weight, said polymers containing acetal linkages, which process requires reacting, in the presence of an acid catalyst, from 2 to 50 moles of 1,3-dioxep-5-ene with 1,4-butanediol.

References Cited in the file of this patent

UNITED STATES PATENTS

| | | |
|---|---|---|
| 2,071,252 | Carothers | Feb. 16, 1937 |
| 2,497,315 | Loder et al. | Feb. 14, 1950 |